Oct. 23, 1928.

F. KUCH 1,688,817

SOUND AMPLIFIER

Filed June 18, 1926

Inventor.

Frederick Kuch.

by A.J.S.Dennison
atty.

Patented Oct. 23, 1928.

1,688,817

UNITED STATES PATENT OFFICE.

FREDERICK KUCH, OF STRATFORD, ONTARIO, CANADA, ASSIGNOR TO THE McLAGAN FURNITURE COMPANY, LIMITED, OF STRATFORD, ONTARIO, CANADA.

SOUND AMPLIFIER.

Application filed June 18, 1926. Serial No. 116,866.

The principal objects of the invention are, to increase amplification of sound waves within a device of small compass and to devise a construction of amplifying chamber which will produce an extremely fine quality and volume of tone.

The principal feature of the invention consists in the novel construction and arrangement of divisional amplifying chambers, whereby the sound waves emanating from the reproducer are directed into a chamber where they are divided and the volume is expanded and amplified and directed through a final dispersing horn.

In the drawings, Figure 1 is a skeleton perspective view of my improved construction of amplifying chamber.

Figure 1:
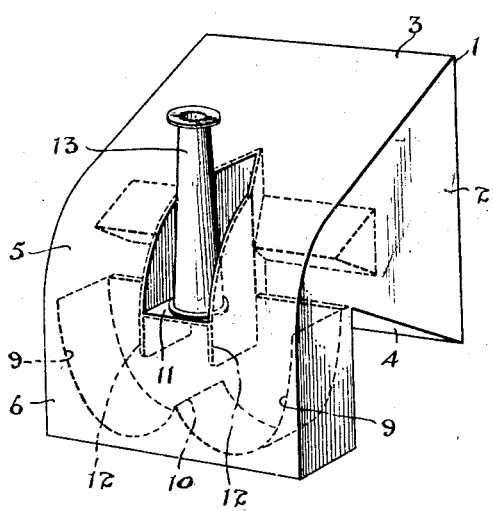
Figure 2:
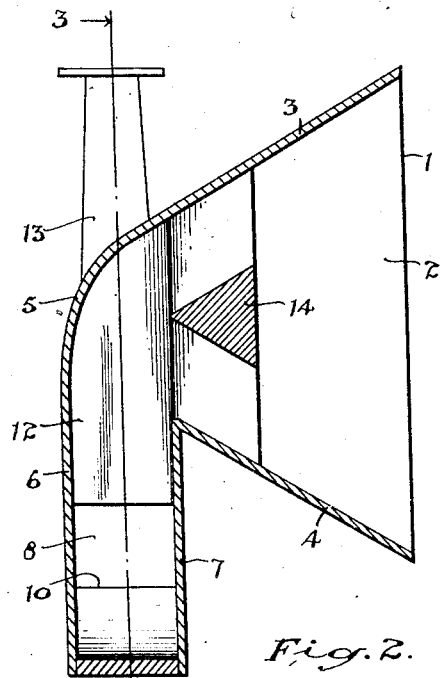
Figure 2 is an enlarged vertical sectional view taken on the line 2—2 of Figure 3.
Figure 3:
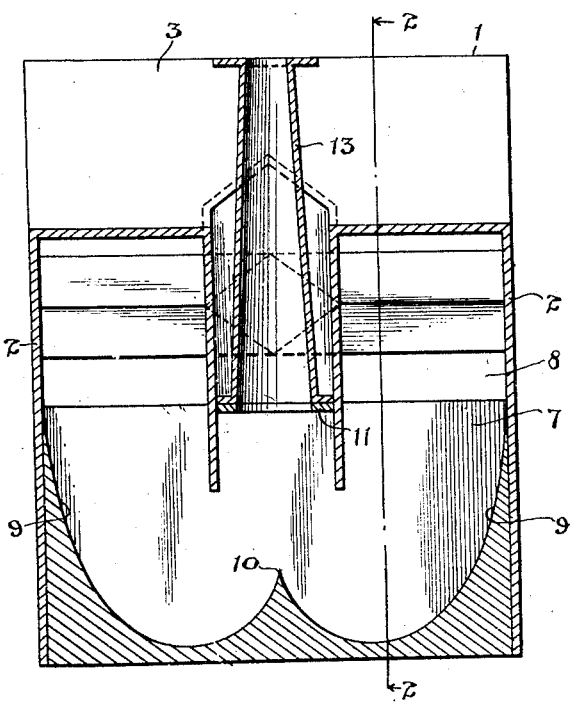
Figure 3 is a vertical sectional view on the line 3—3 of Figure 2.

In the present construction the dispersing horn 1 is formed with straight parallel side walls 2 and uniformly diverging top and bottom walls 3 and 4.

The inward end of the top wall 3 is curved to the rear 5 of the horn structure 1 and terminates in a vertical wall 6 the full width of the horn and a parallelly arranged wall 7 is connected to the inward side of the bottom wall 4 of the horn.

The chamber 8 thus formed at the back of the main body of the horn may extend down any desired distance below the back end of the horn chamber.

The bottom of the chamber 8 is formed with convergingly curved end walls 9 which curve upwardly and meet in the centre, thus forming a dividing ridge 10.

Arranged immediately above the ridge 10 is a partition 11 extending horizontally from the top of the inner wall 7 of the chamber 8 and at both sides of the partition 11 are arranged vertical partitions 12 which extend forwardly from the curved wall 5, the two partitions 12 converging forwardly and projecting into the horn and extending from the top to the bottom wall thereof.

An amplifying tube 13 is supported upon the horizontal partition 11 and extends vertically upwardly between the partitions 12 and the sound arm of the instrument in which the amplifying chamber is arranged is attached to the upper end of the tube 13 so that the sound waves are directed vertically downward through the tube 13 into the chamber 8.

The sound waves being directed toward the ridge 10 from between the lower ends of the partitions 12 are divided and directed outwardly and upwardly by the curved surfaces 9 and striking the curved back wall 5, they are directed forwardly through the throat of the main horn.

In this throat is arranged a transversely disposed triangular-shaped partition 14, the apex of which is spaced intermediate of the height of the throat of the horn and the top and bottom walls are substantially parallel with the top and bottom walls 3 and 4 of the horn.

The sound waves being thus directed forward from the curved wall 5 are divided by the triangular-shaped partition 14 and the full expansion of tone and volume is achieved.

Very remarkable results have been accomplished with an amplifying chamber constructed in the manner described. The chamber is very simple to construct. The walls thereof are preferably formed of wood or other suitable vibrant material that will increase the tone and volume of the sound waves and is of such a nature that it may be readily applied to various shapes of cabinets.

What I claim as my invention is:—

1. A sound amplifier, comprising a chamber formed to divide and divert the sound waves directed thereinto into separate channels, a dispersing chamber extending laterally from the aforesaid chamber having divergent walls, and means adapted to divide the sound waves flowing through each of said channels to the dispersing chamber.

2. A sound amplifier, comprising a chamber formed to divide and divert the sound waves directed thereinto into separate channels, a dispersing chamber extending laterally from the aforesaid chamber having divergent walls, and a division member extending across the throat of the dispersing chamber in the path of the separately diverted sound waves and having diverging surfaces adapted to redivide the separately divided sound waves and direct the same outwardly toward the diverging walls of the dispersing chamber.

3. A sound amplifier, comprising a sound dispersing chamber formed with divergent walls, a chamber arranged in substantially right angular relation to said dispersing chamber and having a curved wall leading from the outer side thereof to and continuous with the upper divergent wall of the dispersing chamber, said right angularly arranged chamber having its end walls convergently curving inward and terminating in a central dividing ridge, means for directing and concentrating the sound waves against said ridge, means arranged between said latter chamber and said dispersing chamber for effecting a further division of the separate groups of sound waves, and means for directing sound waves into the latter chamber directly against said dividing ridge.

4. A sound amplifier, comprising a sound dispersing chamber horizontally arranged and having converging top and bottom walls and parallel side walls, a curved extension leading backwardly from the top wall of said chamber and spaced from the throat thereof, a vertically disposed chamber formed below the throat of said dispersing chamber and having bottom and side walls curving outwardly and upwardly from a centrally dividing ridge, a centrally arranged double partition dividing the upper end of said vertically arranged chamber into two separate sound passages, said partitions extending from said spaced curved extension forwardly into the throat, means arranged in said throat for dividing the sound waves as they pass from said separate passages, and a sound tube arranged between the walls of said double partition and directing sound waves downwardly against the dividing ridge in the lower end of the vertically disposed chamber.

5. A sound amplifier, comprising an amplifying tube, a transversely elongated chamber vertically arranged in connection with the discharge end of the tube and having its bottom wall formed with a ridge curving outwardly and upwardly, a pair of partitions arranged one at each side of said sound tube and projecting below the mounth thereof equally at either side of said ridge, and dividing the upper end of said chamber into two separate sound compartments, a sound dispersing chamber having its throat arranged at the upper side of the aforesaid chamber and receiving the sound waves from said separate sound compartments, and means extending transversely of the throat for dividing the sound waves as they pass from said separate compartments into the dispersing chamber.

FREDERICK KUCH.